(12) United States Patent
Rasmussen

(10) Patent No.: US 9,394,879 B2
(45) Date of Patent: Jul. 19, 2016

(54) STEEL TOWER FOR A WIND TURBINE

(75) Inventor: Anders Nygaard Rasmussen, Copenhagen (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 884 days.

(21) Appl. No.: 13/099,454

(22) Filed: May 3, 2011

(65) Prior Publication Data

US 2011/0271634 A1 Nov. 10, 2011

(30) Foreign Application Priority Data

May 5, 2010 (EP) .................................... 10161946

(51) Int. Cl.
*F03D 1/00* (2006.01)

(52) U.S. Cl.
CPC ........... *F03D 1/001* (2013.01); *F05B 2240/912* (2013.01); *Y02E 10/726* (2013.01); *Y02E 10/728* (2013.01)

(58) Field of Classification Search
CPC ..... F03D 1/001; Y02E 10/726; Y02E 10/728; F05B 2240/912
USPC ......... 52/651.01, 745.04; 455/41.2, 500, 501, 455/418, 419
See application file for complete search history.

(56) References Cited

U.S. PATENT DOCUMENTS

| | | | | |
|---|---|---|---|---|
| 3,109,235 A * | 11/1963 | Harris et al. | .................. | 219/128 |
| 4,728,263 A * | 3/1988 | Basso | ........................... | 416/226 |
| 5,391,926 A * | 2/1995 | Staley et al. | .................... | 290/55 |
| 2005/0230979 A1* | 10/2005 | Bywaters et al. | ............... | 290/44 |
| 2006/0213145 A1* | 9/2006 | Haller | ........................ | 52/651.01 |
| 2007/0294955 A1* | 12/2007 | Sportel | ............................. | 52/40 |
| 2009/0090069 A1 | 4/2009 | Willis | | |
| 2009/0288742 A1* | 11/2009 | Johan et al. | .................... | 148/565 |
| 2010/0135821 A1* | 6/2010 | Bagepalli et al. | ......... | 416/244 R |
| 2010/0139092 A1* | 6/2010 | Sathian et al. | ................... | 29/889 |
| 2010/0281819 A1* | 11/2010 | Thompson | ................. | 52/745.17 |
| 2011/0135398 A1* | 6/2011 | Lopez et al. | ............... | 405/195.1 |

FOREIGN PATENT DOCUMENTS

| | | |
|---|---|---|
| DE | 20 2005 010 398 U1 | 10/2005 |
| GB | 2 419 150 A | 4/2006 |
| WO | WO 2006/040723 A1 | 5/2006 |

OTHER PUBLICATIONS

Xlerplate, Towers Harness the Wind, Jul. 18, 2005, Xlerplate, pp. 1 and 2.*

* cited by examiner

*Primary Examiner* — Joshua J Michener
*Assistant Examiner* — Alp Akbasli

(57) ABSTRACT

A steel tower for a wind turbine with a plurality of segments arranged above each other is provided. The segments include steel having different qualities. The quality of the steel is determined by a yield limit of the steel.

13 Claims, 3 Drawing Sheets

STEEL TOWER FOR A WIND TURBINE

CROSS REFERENCE TO RELATED APPLICATIONS

This application claims priority of European Patent Office Application No. 10161946.8 EP filed May 5, 2010, which is incorporated by reference herein in its entirety.

FIELD OF INVENTION

The invention describes an improved steel tower for a wind turbine and a method of manufacturing the same.

BACKGROUND OF INVENTION

Towers for wind turbines may be constructed of steel or concrete. Whilst wind turbine towers manufactured by concrete are relatively cost efficient they have a significantly higher mass. For example, a rotor having three rotor blades and a diameter of 60 m is supported by a nacelle having a total mass of approximately 207 t. The hub height of the rotor is approximately 50 m. A concrete tower suitable for such rotor has a mass ranging from approximately 430 t to approximately 540 t. In contrast thereto, the mass of a steel tower for supporting such rotor can range from approximately 87 t to approximately 114 t. However, the manufacturing costs associated with a steel tower are approximately twice the costs associated with manufacturing a concrete tower. Steel towers are preferred when the ground cannot carry the foundations and mass of a concrete tower.

Steel towers for wind turbines are generally constructed as hollow steel towers made of prefabricated tower segments. The tower is constructed or assembled by successively lifting and placing a series of tower segments on top of each other, whereby the lowest tower segment is mounted on a foundation, usually made of concrete, and includes access means such as a doorway to later allow access for a maintenance crew. Generally, the tower segments become successively smaller in diameter towards the top of the tower. Neighbouring tower segments may be connected together by means of fasteners such as construction bolts inserted into connection holes in the end flanges. For example, for a pair of tower segments comprising a 'lower' tower segment and an 'upper' tower segment, the connection holes of the neighbouring segments are positioned such that connection holes in the top flange of the lower tower segment match the connection holes in the bottom flange of the upper tower segment.

A typical wind turbine support has thus two structural main elements, the foundation and the tower. The foundation may be designed in various ways, such as a reinforced concrete spread footing, as it is preferred as a cost effective solution. This type of foundation is very suitable for sites where the ground provides a good bearing capacity. The interfaces to the steel towers are often bolted connections.

The wind turbine steel tower is subjected both to dynamic and static loads. A static load is the mass of the rotor and nacelle acting essentially in vertical direction. Another static load is the wind pressure acting essentially in horizontal direction. Dynamic loads are generated for example by the rotation of the rotor and distortions of the air flow when passing the tower which lead to a locally reduced pressure on the rotor blade passing the tower. Since the wind turbine and the associated tower are a dynamically loaded structure, the natural frequency of the tower has a major influence on the loading of the turbine and tower itself. Therefore, the tower must be partly dimensioned to avoid certain natural frequencies corresponding to the rotational speed of the rotor and the frequencies of other structure elements besides to fatigue and static loading. Wind turbine systems generally, as well as static and dynamic loads of wind turbine towers are described in Windkraftanlagen, Robert Gasch and Jochen Twele Eds., 6th edition 2010, Vieweg+Teubner.

A traditional steel tower is a tubular welded steel tower with conical, cylindrical or both shapes. These steel towers comprise shells welded or bolted together into a full tower or several tower segments as mentioned before. Traditionally, the steel type S355 according to EN 10025 is used throughout the tower.

SUMMARY OF INVENTION

It is an object of the invention to provide an improved steel tower for a wind turbine. The improved wind turbine steel tower preferably has a lower mass compared to state of the art wind turbine steel towers. The improved wind turbine steel tower may also have a higher mechanical stability compared to prior art steel towers. Due to the lower mass and higher stability of the improved wind turbine steel tower such tower may be more cost effective, since structure elements of the entire wind turbine system can be dimensioned smaller.

The object of the invention is achieved by a wind turbine steel tower and by a method of manufacturing the same according to the independent claims.

The inventive wind turbine steel tower comprises a plurality of structure elements formed of steel and arranged above each other and forming the steel tower. The lowest structure element is adapted to be connected to a foundation and the highest structure element is adapted to be connected to a nacelle of the wind turbine. At least two structure elements comprise steel having a different quality. A structure element may be a hollow conical or cylindrical element defining the outer skin of the tower.

A structure element in the context of the present invention is defined as an element constituting a significant part of the structure of the entire tower and having a load bearing capability. Connecting elements such as bolts and rivets are not considered to be structure elements. Also shielding elements are not considered to be structure elements. The foundation or a support structure having similar function is not considered to be part of the tower.

The steel quality may be preferably determined by the yield limit, i.e. the maximum admissible yield stress without plastically deforming the structure element.

A higher steel quality provides a higher statically load bearing capacity compared to a lower steel quality. However, the steel quality has no effect on the fatigue capacity. Therefore, for structure elements designed for a high fatigue load, a high and expensive steel quality is not necessary. For structure elements that have to be designed particularly with respect to their natural frequency, a high quality steel and thus expensive material is also not necessary. Therefore, the present invention proposes to use a high steel quality for structure elements subjected to a higher statically load. Structure elements essentially optimized for fatigue load and/or designed for frequency requirements may be manufactured by using a lower steel quality.

In other words, the present invention proposes to vary the steel quality throughout the tower. Where static loading is the determining design criterion, steel having a higher strength and higher quality may be used. Where fatigue is the determining design criterion, a lower steel quality may be used. In portions of the steel tower, where material is only added to the structure elements to obtain stiffness and/or to fulfil natural frequency requirements, a lower steel quality may be used. Finally, where the design is determined by more than one of the above mentioned requirements, a steel quality giving an optimum between the different design criteria may be used. Individual structure elements of the tower may be optimized with regard to the structural design so that the resulting costs of the tower may be optimized by changing the steel quality in the respective structure elements and the thickness of the structure elements.

The most cost effective relationship between steel quality for each of the structure elements and the dimensions of each structure element may be determined by an iterative approach. For example, it is possible to increase the thickness of the structure element incrementally, e.g. in steps of 1 mm, when a lower steel quality is to be used in order to reduce costs. This may be realized in the context of a method of simulating a construction of a wind turbine steel tower, comprising the steps of arranging a plurality of virtual structure elements representing a plurality of structure elements formed of steel above each other. In such simulation, according to the invention, at least two virtual structure elements represent structure elements comprising steel having a different quality. This simulation may be used as a basis for the subsequent real construction of the wind turbine steel tower. Hereby, the steel quality providing the appropriate structural quality and optimal costs can be determined in order to reduce total costs of the steel tower to a minimum.

Particularly advantageous embodiments and features of the inventions are given by the dependent claims, as revealed in the following description. Thereby, features revealed in the context of one claim category may also be realized in the context of another.

Each structure element may be part of the shell of the tower. At least one structure element forms a segment of the wind turbine tower. Preferably one segment is a structure element. Each segment may be framed substantially tubular and the plurality of segments are arranged such to form the essentially tubular steel tower. The cross section of a segment may be round, ellipsoid, square, polygonal and the like.

The segments may be connected by welding, bolts and/or rivets. Steel components having different quality can be connected by appropriate welding techniques.

A structure element may also be an essentially plate shaped element, wherein a plurality of such plate shaped elements are connected in order to form a hollow segment of the tower. Such plate shaped elements can be connected by welding, bolts and/or rivets.

As mentioned above, structure elements subjected to higher static loading may be manufactured using steel having a higher quality. In contrast thereto, structure elements essentially or mainly subjected to fatigue and/or essentially or mainly designed for frequency characteristics of the tower may be manufactured using steel having a lower quality. A structure element of the upper portion of the wind turbine steel tower may comprise steel having a higher quality than a structure element of a lower portion of the wind turbine steel tower. Typically, the determining design criterion for the upper portion of a wind turbine steel tower is static loading. Thus, a higher steel quality is used in the upper portion. Consequently, the thickness of the structure elements in the higher portion of the tower can be reduced. This results in a lower mass of the tower and accordingly also structure elements in lower portions of the tower may be dimensioned smaller. Further thereto, the foundation of the entire wind turbine system can be dimensioned smaller. Thereby, the costs and mass of the entire wind turbine system can be reduced.

The invention also relates to a method of manufacturing a steel tower for a wind turbine comprising the steps of arranging a plurality of structure elements formed of steel above each other, wherein at least two structure elements comprise steel having a different quality.

The method may further comprise the steps of manufacturing structure elements subjected to higher static loading using steel having a higher quality. The method may further comprise the step of manufacturing structure elements essentially subjected to fatigue and/or essentially designed for frequency characteristics of the tower using steel having a lower quality. Moreover, the method may further comprise the steps of manufacturing structure elements in the upper portion of the tower using steel having a higher quality, and manufacturing structure elements in the lower portion of the tower using steel having a lower quality.

Other objects and features of the present invention will become apparent from the following detailed description considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like reference numerals refer to like objects throughout the description. Objects in the diagrams are not necessarily drawn to scale.

DETAILED DESCRIPTION OF INVENTION

Figure 1:
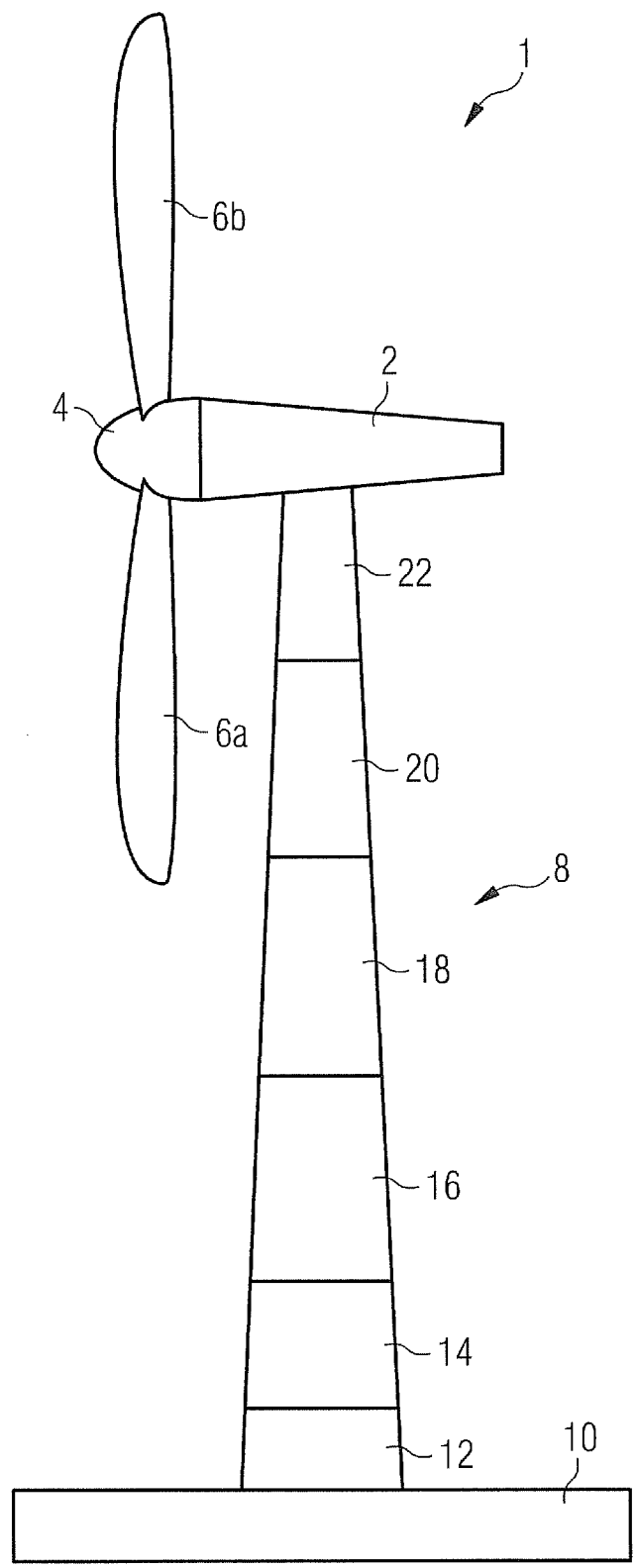
FIG. 1 shows a side view of a wind turbine having a steel tower.

FIG. 1 shows a schematic view of a wind turbine system 1. The wind turbine system 1 comprises a rotor 4 having three rotor blades 6a, 6b. The rotor 4 is mounted on a nacelle 2. The nacelle 2 is supported by a steel tower 8. The steel tower 8 is bolted to a foundation 10. The steel tower 8 comprises a plurality of structure elements 12, 14, 16, 18, 20, 22 each configured as a tubular segment. The tubular segments are arranged above each other. The tubular segments may be connected by welding or bolting. The lowest segment 12 may be bolted to the foundation. The nacelle 2 is bolted to the upper segment 22. Each of the segments 12, 14, 16, 18, 20, 22 consists of steel.

Figure 2:
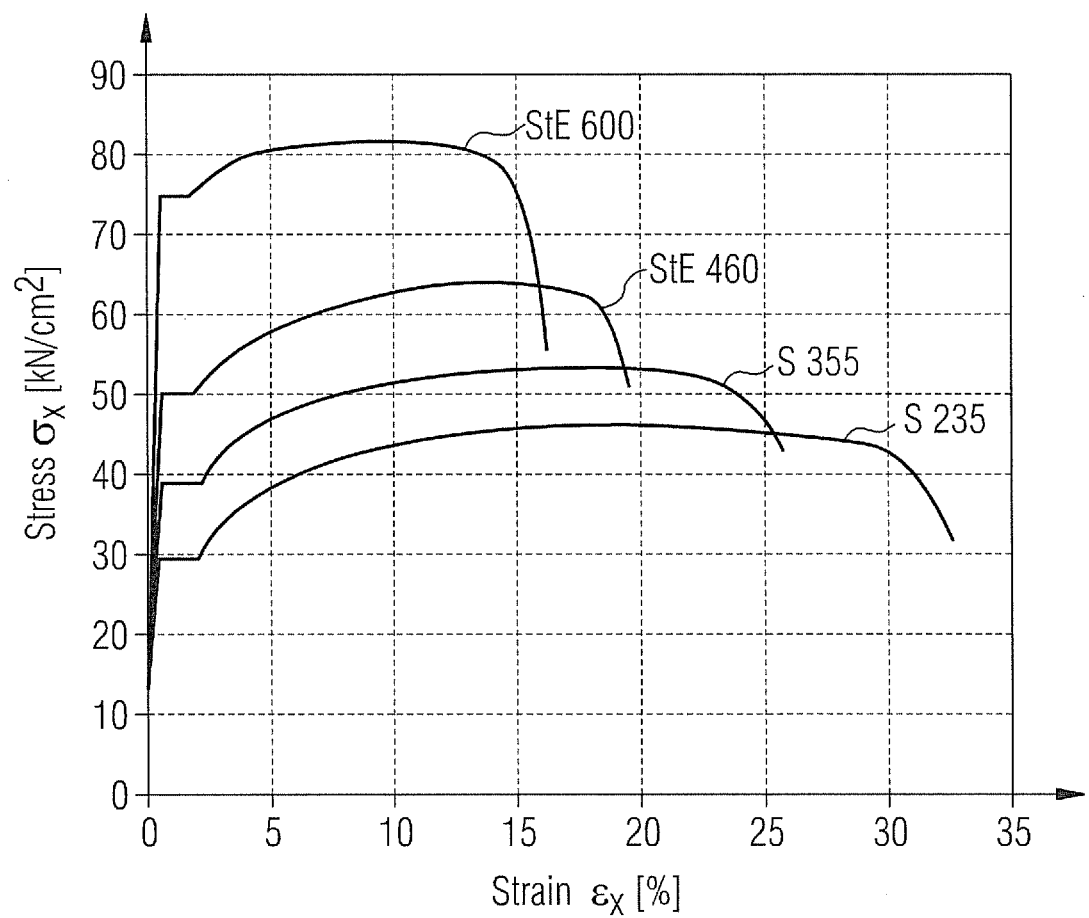
FIG. 2 shows the σ-ε relationship for different steel types.

An important characteristic of steel is stress σ [kN/cm$^2$] versus strain ε [%]. FIG. 2 shows a σ-ε diagram for different steel types. FIG. 2 has been published by "Der Prüfingenieur", April 2003, "Plastische Bemessung im Stahlbau", Univ.-Prof. Dr.-Ing. Rolf Kindermann and Dr.-Ing. Jörg Freckel. If the stress applied on the structure element is lower than the yield limit, the strain is proportional to the stress, as is shown by the linearly rising portion on the left side of FIG. 2. As soon as the stress σ reaches the yield limit, the strain increases although the stress does not increase. This is indicated by the horizontal section of the σ-ε curves of the different steel types. If the stress increases further, the structure element is deformed plastically and finally destroyed. As can be seen in FIG. 2, different steel qualities have different yield limits.

The following table shows the yield limit for different steel types according to EN 10025.

| Steel type | Yield limit [N/mm²] for pressure stress and tensile stress |
|---|---|
| S235 | 235 |
| S355 | 355 |
| S460 | 460 |
| S600 | 600 |

Although the different steel types comprise different yield limits, these steel types comprise the same Young's module. Accordingly, the different steel types comprise the same properties with respect to elastic deforming and frequency behavior.

The exemplary wind turbine system 1 may be a wind turbine system of the type WKA-60-II. The system of FIG. 1 comprises a rotor having three rotor blades. The nominal speed of the rotor is 23 min$^{-1}$. The hub height is approximately 50 m. The nacelle has a mass of approximately 207 t. The tower has a mass of approximately 90 t. The diameter of the lower segments is approximately 7.5 m and the diameter of the upper segments is approximately 3.2 m. Both the upper and lower segments may have a wall thickness of 20 mm. The wall thickness may vary throughout the tower. It is possible that the upper segments have a wall thickness of 20 mm, whereas the lower segments comprise a wall thickness of 35 mm.

Figure 3:
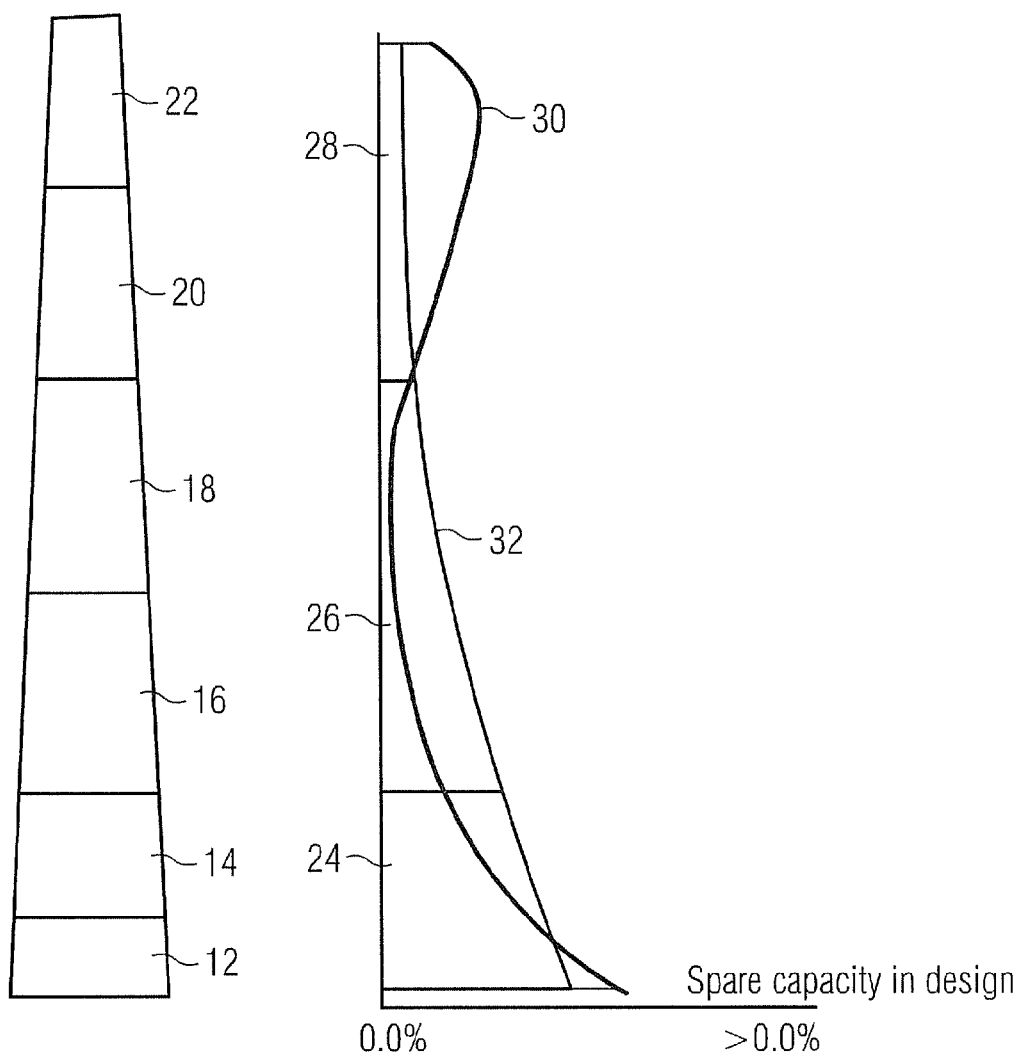
FIG. 3 shows a diagram illustrating the determining design criteria for different sections of the wind turbine steel tower.

Reference is made to FIG. 3. As mentioned before, the steel tower of a wind turbine system is subjected to static and dynamic loading. In a tower design for a wind turbine, different sections of the tower 8 have to be optimized for the different requirements. The upper section 28 of the above mentioned exemplary wind turbine steel tower has to be designed for high static loading, since the determining design criterion of the upper section of the tower is the extreme load design criterion. Accordingly, segments 20, 22 are formed of a high quality steel, such as S460. The mid section 26 of the tower 8 is subjected both to static and dynamic loads, and is accordingly determined by the combined load design criterion. Therefore, the segments 16, 18 in the mid section of the tower may be manufactured of steel having the average quality such as S355.

The lower section 24 of the wind turbine tower 8 has to be optimized for dynamic loading and frequency requirements. This section of the tower is thus determined by the frequency controlled design criterion. Therefore, the lower segments 12, 14 may be manufactured from steel having a lower quality such as S275.

The quality of the steel may be referred to as the maximum admissible steel stress, i.e. yield limit, as it is used for the stability and buckling calculation of the tower. The steel tower 8 is optimized with respect to overall cost by optimizing the local structural steel elements used in the tower. The structural capacity of each steel element is then optimized based on the design criterion and overall cost. This achieves a tower with a lower cost, but the same overall stability as more expensive steel towers with steel elements of one quality throughout the tower as known in the state of the art. Further thereto, the mass of the tower is reduced.

FIG. 3 shows a plot of the fatigue capacity 30 and a plot of the extreme load capacity 32. The team capacity indicates the over-fulfillment of the design requirements. I.e. the segments 20, 22 of the upper section 28 are designed such that the extreme load requirement, i.e. static load, are fulfilled. Nevertheless, the design comprises a higher load capacity as required and as is indicated by curve 32. Since the upper section 28 is not determined by the fatigue criterion, the upper section 28 comprises a high fatigue capacity as is shown by curve 30. Accordingly the segments 20, 22 of the upper section 28 may be manufactured by a higher steel quality (e.g. S460 as mentioned before) and may have thinner walls. This leads to the same static load capacity but to a lower fatigue capacity as well as to a lower mass of the upper section 28 of the tower 8. The capacity of the tower is still as high as required, but the mass and the cost has been reduced. An optimum may have been reached.

The mid section 26 has to fulfil both frequency requirements and static loading requirements. Accordingly, the segments 16, 18 of the mid section 26 may comprise thicker walls than the segments 20, 22 of the upper section 28 in order to fulfil the frequency requirement and the corresponding fatigue requirement. There is a significant static load capacity in the mid section 26 as indicated by curve 32. Therefore, steel having a lower quality, such as a lower yield limit, may be used, S355 for example.

In this embodiment an optimum, for a design with moderate static load and fatigue load, may be steel with moderate capacity, such as S355. The capacity is still as high as required, but cost is optimized.

As mentioned before, the lower section has to fulfill primarily the frequency requirements of the tower. Particularly, the tower has to be stiff and the natural frequency of the tower must not collide with the turbine rotational frequency. Therefore, the segments 12, 14 of the lower section 24 will comprise thicker walls than the segments 16, 18 in the mid section 26. Accordingly, the segments 12, 14 of the lower section 24 may comprise steel having a lower quality than the segments 16, 18 of the mid section 26, such as S275.

Depending on the tower design and/or the operation location of the tower, the fatigue capacity may be the design driver, and not the frequency capacity. In another tower design and/or operation location, the static loading (extreme loading) may be the design driver. The steel quality of the structure elements of the tower has to be selected such that the capacity requirement is fulfilled and cost is at a minimum.

It is to be understood that the most cost effective combination of steel quality, wall thickness and mass of the segments 12, 14, 16, 18, 20, 22 of the tower 8 may be determined in an iterative process. The first step may commence with a traditional tower designs, in which all segments comprise the same steel quality. In a second step the stability calculation is performed under the condition that the segments 20, 22 of the upper section 28 are designed using steel having a higher quality and thinner walls. In the next steps the mid section 26 and the lower section 24 may be redesigned, since the sections above comprise a different mass and frequency behaviour. Finally the foundation 10 may be recalculated, since the tower has a lower mass. Thereby, the steel quality and optionally the thickness of the structure elements may be iteratively selected such that cost of the tower is at a minimum.

Such iterative method can be carried out in a simulation before the actual construction of the tower. In the context of such a simulation, the structure elements 12, 14, 16, 18, 20, 22 are represented by virtual structure elements. Accordingly the simulation has the outcome that at least two such virtual structure elements represent structure elements comprising steel having a different quality. Steps of the simulation method may be executed on a computer having a CPU and RAM. A computer program product may comprise program code means that, when executed on a computer, perform steps of the afore-mentioned simulation method. Such a computer program product can be based on known construction calculation and simulation programs or parts thereof which are readily available on the market. Such program can in particular use calculations based on the finite elements method, but also other logics may be used instead or in addition. In particular it is advantageous if the program has an interface for the input of basic structure data of the tower, such as dimensions (height and/or height of segments) and/or load data such as of the wind turbine and/or nacelle etc. Any of these data can be defined by a user and/or an automatic logic. Then, based on the input supplied, an iterative calculation can be used to optimize the design of the tower with respect to (amongst other questions) the steel used for construction. This iterative step can, for example, be carried out in a question-and-answer mode during which questions are supplied to the user. In a very comfortable version of such program, the output may not only comprise data referring to the construction itself and the maximum load which such tower is expected to endure, but also a construction cost approximation. For such purpose, the program may include an input section for introducing cost data for single components and/or materials.

Although the present invention has been disclosed in the form of preferred embodiments and variations thereon, it will be understood that numerous additional modifications and variations could be made thereto without departing from the scope of the invention.

It is to be understood that the present selection of steel quality and/or design criteria throughout the tower is merely exemplary. This selection may vary depending on turbine characteristics, earthquake requirements, local wind and wave situation.

For the sake of clarity, it is to be understood that the use of "a" or "an" throughout this application does not exclude a plurality, and "comprising" does not exclude other steps or elements.

The invention claimed is:

1. A method of manufacturing a wind turbine steel tower, comprising:
   arranging a plurality of structure elements formed of steel above each other, wherein at least two structure elements comprise steel of a different quality, said quality of the steel being proportional to a maximum admissible yield stress below which the stress is configured to maintain its form;
   selecting a first steel to form a first structure element with a first quality proportional to a first maximum admissible yield stress; and
   selecting a second steel to form a second structure element with a second quality proportional to a second maximum admissible yield stress;
   wherein the first structure element is positioned above the second structure element on the steel tower and wherein the first maximum admissible yield stress is greater than the second maximum admissible yield stress.

2. The method according to claim 1, further comprising: manufacturing structure elements subjected to higher static loading using steel having a higher quality.

3. The method according to claim 1, further comprising: manufacturing structure elements in an upper portion of the tower using steel having a higher quality; and manufacturing structure elements in an lower portion of the tower using steel having a lower quality.

4. A wind turbine steel tower, comprising:
   a plurality of structure elements formed of steel and arranged above each other and forming the steel tower,
   wherein a lowest structure element is configured to be connected to a foundation and a highest structure element is adapted to be connected to a nacelle of a wind turbine, and
   wherein the lowest structure element and the highest structure element comprise steel of different qualities, said quality of the steel being proportional to a maximum admissible yield stress below which the steel is configured to maintain its form, and
   wherein a first steel is selected to form the highest structure element with a first quality proportional to a first maximum admissible yield stress, wherein a second steel is selected to form the lowest structure element with a second quality proportional to a second maximum admissible yield stress, wherein the first maximum admissible yield stress is greater than the second maximum admissible yield stress.

5. The wind turbine steel tower according to claim 4, wherein at least one structure element forms a segment of the wind turbine steel tower.

6. The wind turbine steel tower according to claim 5, wherein each segment is formed essentially tubular and the plurality of segments are arranged to form the essentially tubular steel tower.

7. The wind turbine steel tower according to claim 6, wherein the segments are connected by welding, bolts and/or rivets.

8. The wind turbine steel tower according to claim 5, wherein a plurality of structure elements forming a segment are connected by welding, bolts and/or rivets.

9. The wind turbine steel tower according to claim 4, wherein structure elements subjected to higher static loading are manufactured using steel having a higher quality.

10. The wind turbine steel tower according to claim 4, wherein a structure element of the upper portion of the wind turbine steel tower comprises steel having a higher quality than a structure element of a lower portion of the wind turbine steel tower.

11. The wind turbine steel tower according to claim 10, wherein the structure elements of the upper portion of the wind turbine steel tower are thinner than structure elements of a lower portion of the wind turbine steel tower.

12. The wind turbine steel tower according to claim 4, wherein the first steel is selected to form the highest structure based on a static load at the highest structure during an operation of the wind turbine steel tower.

13. The wind turbine steel tower according to claim 4, wherein the second steel is selected to form the lowest structure based on frequency characteristics of the steel tower.

* * * * *